United States Patent
Sharma

(10) Patent No.: US 12,143,657 B2
(45) Date of Patent: Nov. 12, 2024

(54) SYSTEMS AND METHODS FOR PRESENTING CONTENT SIMULTANEOUSLY IN DIFFERENT FORMS BASED ON PARENTAL CONTROL SETTINGS

(71) Applicant: Rovi Guides, Inc., San Jose, CA (US)

(72) Inventor: Priyanka Sharma, Burbank, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 18/529,280

(22) Filed: Dec. 5, 2023

(65) Prior Publication Data

US 2024/0107100 A1  Mar. 28, 2024

Related U.S. Application Data

(63) Continuation of application No. 17/837,628, filed on Jun. 10, 2022, now Pat. No. 11,871,064, which is a
(Continued)

(51) Int. Cl.

| H04N 21/41 | (2011.01) |
|---|---|
| H04N 21/439 | (2011.01) |
| H04N 21/45 | (2011.01) |
| H04N 21/454 | (2011.01) |
| H04N 21/462 | (2011.01) |

(Continued)

(52) U.S. Cl.
CPC ... *H04N 21/41265* (2020.08); *H04N 21/4394* (2013.01); *H04N 21/4532* (2013.01); *H04N 21/4542* (2013.01); *H04N 21/4622* (2013.01); *H04N 21/4751* (2013.01); *H04N 21/4884* (2013.01); *H04N 21/6125* (2013.01); *H04N 21/8106* (2013.01)

(58) Field of Classification Search
CPC .......... H04N 21/4126; H04N 21/8106; H04N 21/6125; H04N 21/4884; H04N 21/4751; H04N 21/4622; H04N 21/4542; H04N 21/4532; H04N 21/4394

See application file for complete search history.

(56) References Cited

U.S. PATENT DOCUMENTS

| 8,312,484 B1 | 11/2012 | McCarty et al. |
| 2007/0204288 A1 | 8/2007 | Candelore |

(Continued)

*Primary Examiner* — Alazar Tilahun
(74) *Attorney, Agent, or Firm* — Haley Guiliano LLP

(57) ABSTRACT

Systems and methods for identifying objects displayed in a media asset are provided. First and second parental control restrictions associated with first and second users within a perceivable range of a user equipment device are retrieved. The first parental control restriction enables access to content associated with a first authorization level and the second parental control restriction enables access to content associated with a second authorization level. A common authorization level that does not violate the first and second parental control restrictions is identified. A media asset that satisfies the common authorization level is presented to the first and second users in a first form. Supplemental content associated with the media asset that violates the second parental control restriction but does not violate the first parental control restriction is selected. The supplemental content is presented in a second form while the media asset is being presented in the first form.

20 Claims, 6 Drawing Sheets

Related U.S. Application Data continuation of application No. 17/171,068, filed on Feb. 9, 2021, now Pat. No. 11,395,029, which is a continuation of application No. 16/213,926, filed on Dec. 7, 2018, now Pat. No. 10,951,939, which is a continuation of application No. 15/701,405, filed on Sep. 11, 2017, now Pat. No. 10,200,734, which is a continuation of application No. 13/687,627, filed on Nov. 28, 2012, now Pat. No. 9,762,944.

(51) Int. Cl.
*H04N 21/475* (2011.01)
*H04N 21/488* (2011.01)
*H04N 21/61* (2011.01)
*H04N 21/81* (2011.01)

(56) References Cited

U.S. PATENT DOCUMENTS

| | | |
|---|---|---|
| 2008/0046930 A1 | 2/2008 | Koch et al. |
| 2009/0133051 A1* | 5/2009 | Hildreth ............ H04N 21/42204 725/28 |
| 2011/0185312 A1 | 7/2011 | Lanier et al. |
| 2011/0310235 A1 | 12/2011 | Sasaki et al. |
| 2012/0167123 A1* | 6/2012 | Gavita ............... H04N 21/4751 725/25 |
| 2012/0216222 A1* | 8/2012 | Candelore .......... H04N 21/8106 725/28 |
| 2015/0070516 A1 | 3/2015 | Shoemake et al. |
| 2021/0168424 A1 | 6/2021 | Sharma |
| 2022/0394318 A1 | 12/2022 | Sharma |

\* cited by examiner

500

Parental Control Settings

User 1 : No Limits [Modify]—512

User 2 : Rating Limit—530　　Channel Restriction—532　　Category Limit—534

[PG - 13 & Below ▼]　　[1, 3, PBoy]　　[Sex, Action]

User 3 : Rating Limit

[G & Below ▼]

[Add User]—514

510

Parental Control Conflict Resolution

520

Select Any One or More

- ⊙ Display Media Asset Version that does not Violate Restrictions of Any User in the Room on Shared Screen —522
- ○ Block Media Asset from Being Displayed on Shared Screen if it Violates Any Parental Control Restrictions —524
- ○ Display Media Asset Version that Violates a Parental Control Restriction on Second Screen Device Associated with User for Which Parental Control Restriction is not Violated —526
- ⊙ Display Supplemental Content Associated with the Media Asset that Violates One of the Parental Controls in a Different Form on the Shared Display —528

FIG. 5

SYSTEMS AND METHODS FOR PRESENTING CONTENT SIMULTANEOUSLY IN DIFFERENT FORMS BASED ON PARENTAL CONTROL SETTINGS

CROSS-REFERENCE TO RELATED APPLICATION(S)

This application is a continuation of U.S. patent application Ser. No. 17/837,628, filed Jun. 10, 2022, which is a continuation of U.S. patent application Ser. No. 17/171,068, filed Feb. 9, 2021, now U.S. Pat. No. 11,395,029, which is a continuation of U.S. patent application Ser. No. 16/213,926, filed Dec. 7, 2018, now U.S. Pat. No. 10,951,939, which is a continuation of U.S. patent application Ser. No. 15/701,405, filed Sep. 11, 2017, now U.S. Pat. No. 10,200,734, which is a continuation of Ser. No. 13/687,627, filed Nov. 28, 2012, now U.S. Pat. No. 9,762,944, the disclosures of each application are incorporated by reference in their entireties.

BACKGROUND

Traditional systems choose content to display based on the most restrictive parent control settings in effect regardless of the parent control settings for other users in the room. Although, this conservative approach prevents content from being presented to a user to which presentation of the content would violate the user's parental control settings, it also prevents the content from being presented to other users in the room whose parental control settings would not have been violated by the content. Accordingly, the content enjoyment of other users in the room is negatively impacted. There is no mechanism for presenting content, that violates a given user's parental control settings, to all the users in the room while still satisfying each user's individual parental control settings.

SUMMARY

In view of the foregoing, systems and methods for presenting content simultaneously in different forms based on parental control settings in accordance with various embodiments of the present invention are provided.

In some embodiments, first and second parental control restrictions associated with first and second users that are within a perceivable range of a user equipment device are retrieved. The first parental control restriction enables access to content associated with a first authorization level and the second parental control restriction enables access to content associated with a second authorization level. In some implementations, the second authorization level is greater than the first authorization level. In some implementations, the first authorization level corresponds to a first content rating and the second authorization level corresponds to a second content rating, where the second content rating is lower than the first content rating.

A common authorization level that does not violate the first and second parental control restrictions may be identified. A media asset meeting the common authorization level is caused to be presented to the first and second users in a first form. The first form may be presentation of video of the media asset on a shared screen device. Supplemental content associated with the media asset that violates the second parental control restriction and does not violate the first parental control restriction may be selected. The supplemental content may be caused to be presented in a second form different from the first form while the media asset is being presented in the first form. The second form may be subtitles associated with the media asset.

In some embodiments, a maximum authorization level of each of the first and second parental control restrictions may be determined. A minimum value among the maximum authorization levels of the first and second parental control restrictions may be computed. The minimum value that is computed may be assigned as the common authorization level.

In some embodiments, a plurality of sets of subtitles corresponding to the media asset may be stored. Each subtitle set in the plurality of sets of subtitles includes language in the subtitles that is suitable for different content authorization levels. In some implementations, the supplemental content may be selected using the subtitle sets. Specifically, a maximum content authorization level of the first parental control restriction may be determined. One of the sets of subtitles having language that is suitable for the maximum content authorization level may be selected. The selected subtitle set may be presented to the first and second users or on a second screen device associated with only one of the users for which the subtitle set does not violate the parental control restrictions.

In some embodiments, a plurality of versions of the media asset may be stored. Each version in the plurality of versions of the media asset may include content that is suitable for different content authorization levels. In some implementations, the media asset meeting the common authorization level is caused to be presented using one of the versions. Specifically, a maximum authorization level of each of the first and second parental control restrictions is determined. A minimum value among the maximum authorization levels of the first and second parental control restrictions is computed. One of the plurality of versions of the media asset having content that is suitable for the minimum value is selected. In some implementations, a first version of the plurality of versions of the media asset includes audio content suitable for the first authorization level but not the second authorization level and a second version of the plurality of versions of the media asset includes audio suitable for the first authorization level and the second authorization level.

In some embodiments, the media asset meeting the common authorization level is caused to be presented by performing real-time editing to obscure content that violates one of the parental control restrictions. Specifically, a portion of the content of the media asset that is being presented to the first and second users is monitored. A determination is made as to whether the monitored portion includes content that violates one of the first and second parental control restrictions. In response to determining the monitored portion includes content that violates one of the first and second parent control restrictions, the portion of the content that violates the one of the first and second parental control restrictions may be obscured (e.g., replaced with alternate content that does not violate the first and second parental control restrictions).

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 5 shows an illustrative display screen of setting up parental control restrictions in accordance with an embodiment of the invention;

DETAILED DESCRIPTION

Figure 1:
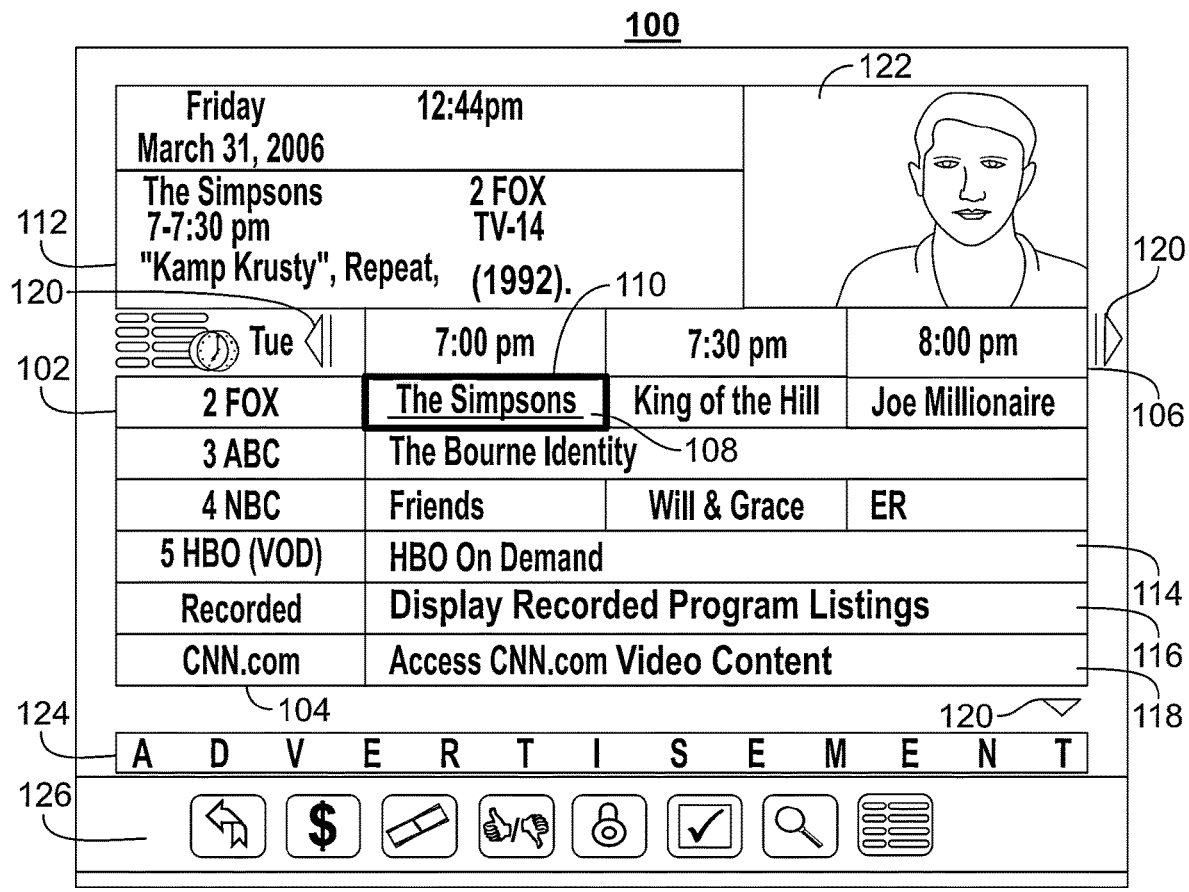
FIGS. 1 and 2 show illustrative display screens that may be used to provide media guidance application listings in accordance with an embodiment of the invention.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a website), or as stand-alone applications or clients on user equipment devices. Various devices and platforms that may implement media guidance applications are described in more detail below.

One of the functions of the media guidance application is to provide media guidance data to users. As referred to herein, the phrase, "media guidance data" or "guidance data" should be understood to mean any data related to content, such as media listings, media-related information (e.g., broadcast times, broadcast channels, titles, descriptions, ratings information (e.g., parental control ratings, critic's ratings, etc.), messages from a crowd of users on a social network, messages from a crowd of users posted to a blog or website, genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections. In some implementations, this data may be referred to as a data feed. As referred to herein the term "crowd" should be understood to mean any number of users greater than one.

Figure 2:
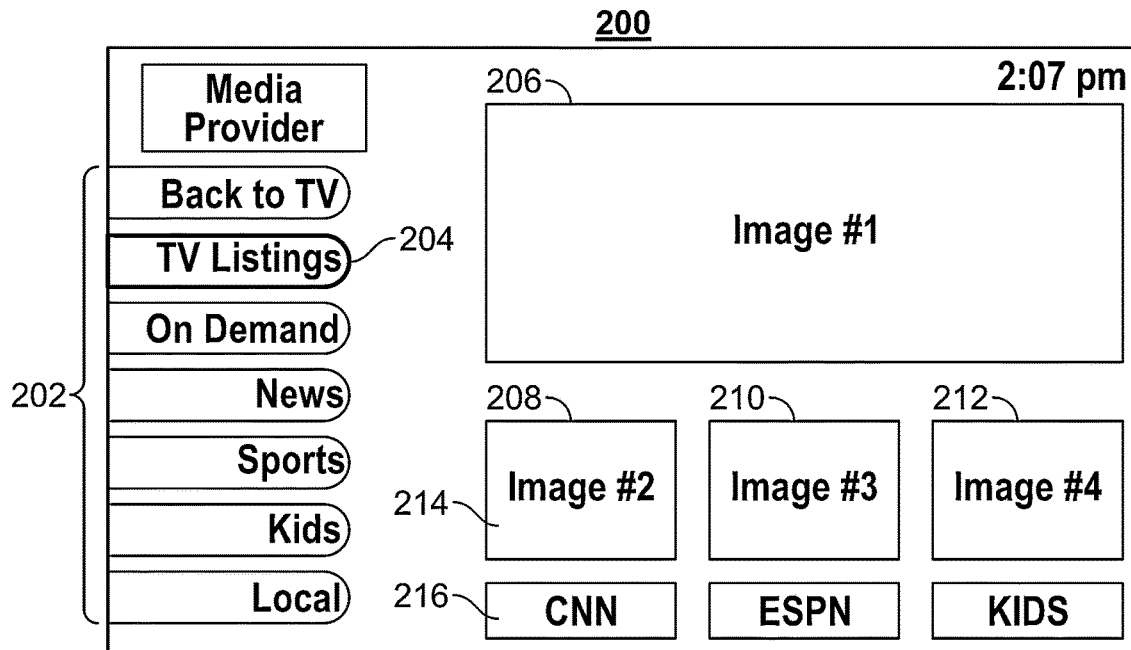

FIGS. 1-2 show illustrative display screens that may be used to provide media guidance data. The display screens shown in FIGS. 1-2 and 5-7 may be implemented on any suitable user equipment device or platform. While the displays of FIGS. 1-2 and 5-7 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria. The organization of the media guidance data is determined by guidance application data. As referred to herein, the phrase, "guidance application data" should be understood to mean data used in operating the guidance application, such as program information, guidance application settings, user preferences, or user profile information.

As referred to herein, the phrase "in response" should be understood to mean automatically, directly and immediately as a result of or automatically based on the corresponding action where intervening inputs or actions may occur.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet website or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different from display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other airtimes or ways of receiving a program, recording a program, enabling series recording of a program, setting program and/or channel as a favorite, purchasing a program, setting parent control restrictions, or other features. Options available from a main menu display may include search options, VOD options (e.g., fast-access playback operations), parental control options, Internet options, cloud-based options, device synchronization options, second screen device options, options to access various types of media guidance data displays, options to subscribe to a premium service, options to edit a user's profile, options to access a browse overlay, or other options. As referred to herein, the term "object" means a character, product being advertised, advertisement, furniture, item in a scene, background item, or other article in an image or video that has distinguished boundaries that are discernible from other articles in the image or video.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other websites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
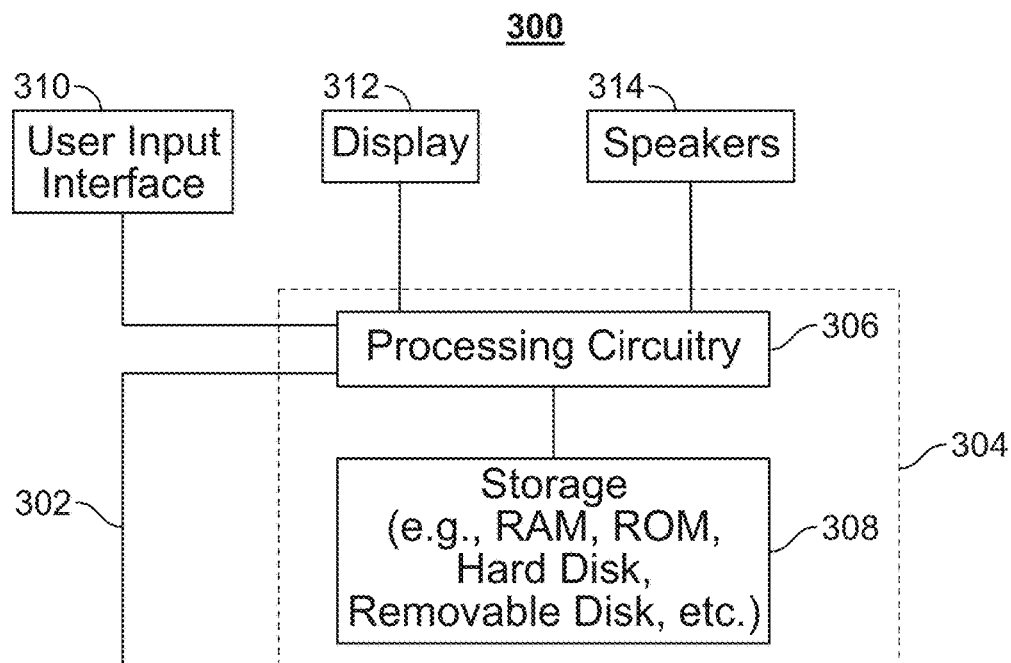
FIG. 3 shows an illustrative user equipment device in accordance with another embodiment of the invention.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

In some embodiments, a viewing history may be stored in storage 308 for a user. The viewing history may include indications of which media assets have been viewed by a given user. The viewing history may also include, for each media asset, which portion or portions have or have not been viewed by the user. In some implementations, the viewing history may include indications of which users in a group of users have seen or viewed a media asset or a particular segment of a media asset. The group of users may be users in a certain geographical location (e.g., in the same home) or users that are associated with each other on a social network.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above-mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance information, described above, and guidance application data, described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

Control circuitry 304 may include a user recognition engine. The user recognition engine may identify users that are within a perceivable range or a predetermined range of user equipment device 300. For example, the user recognition engine may implement facial recognition techniques to identify faces of users within the perceivable range of user equipment device 300. Once the faces are identified, the user recognition engine may retrieve a user profile associated with each user to identify and put into effect parental control restrictions associated with each user. In some embodiments, user recognition engine may identify users within the perceivable range of user equipment device 300 by attempting to communicate or communicating with portable devices associated with the respective users. The portable devices that user recognition engine is able to establish connections with (e.g., using a short-range or long-range communications path) may be identified as users within the perceivable range of user equipment device 300. Once the users within the perceivable range are identified, the user recognition engine may retrieve a user profile associated with each user to identify and put into effect parental control restrictions associated with each user. Systems and methods for identifying users within a perceivable range of a user equipment device are discussed in further detail in, for example, filed Sep. 23, 2009, which is hereby incorporated by reference herein in its entirety.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. User input interface 310 may include keys or displayed options that enable a user to instruct control circuitry 304 to identify a displayed object corresponding to the key pressed. For example, user input interface may be a touch-screen device such that a video displayed underneath or above the touch-screen allows a user to point by pressing on the touch-screen to the object the user requests control circuitry 304 to identify. In particular, user input interface 310 may enable a user to request information to be displayed for an object displayed in the media asset if information is indicated to be available. Alternatively, user input interface 310 may enable a user to select an object displayed in the media asset for which information is indicated to be not available and for which the user would like to provide information.

Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally, and data for use by the application is downloaded on a periodic basis (e.g., from an out-of-band feed, from an Internet resource, or using another suitable approach). In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
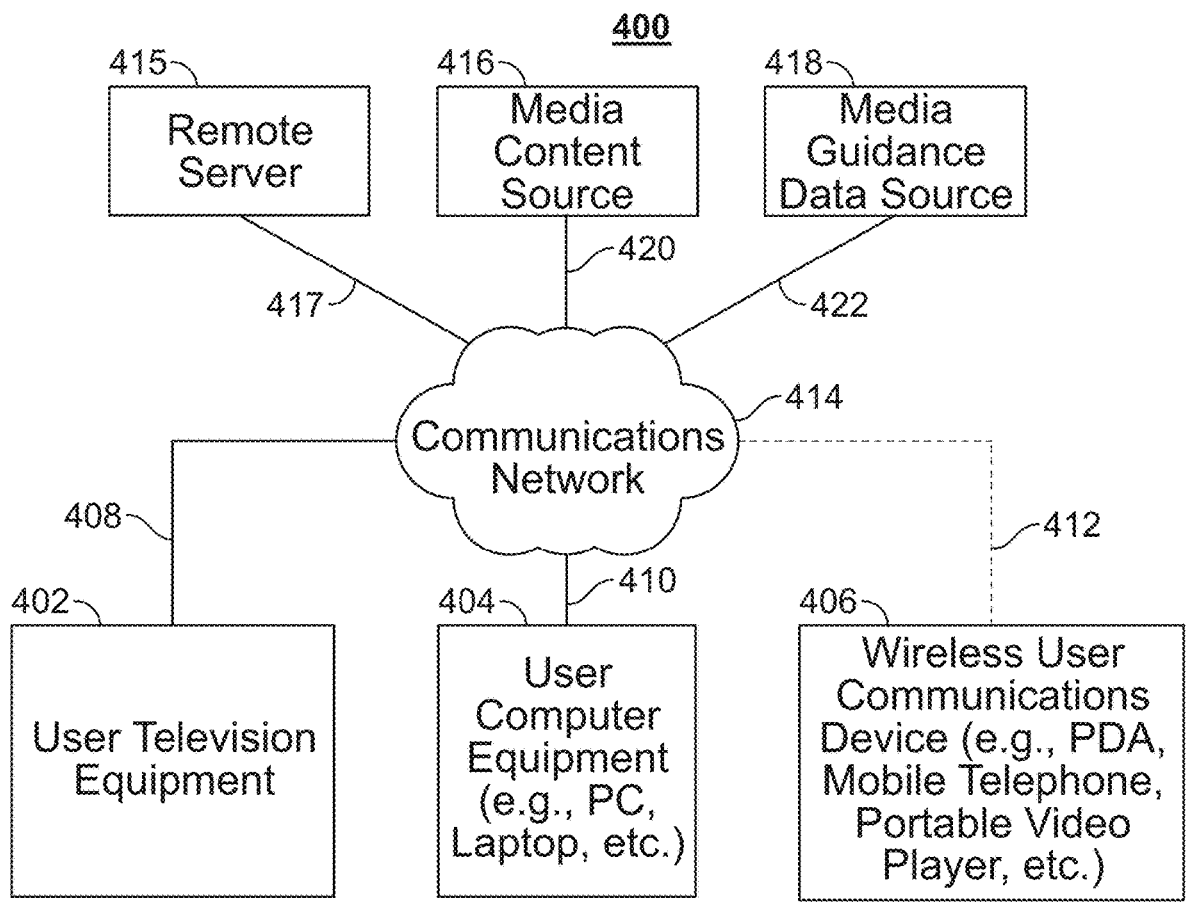
FIG. 4 is a diagram of an illustrative cross-platform interactive media system in accordance with another embodiment of the invention.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a stand-alone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a website accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the website www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Each user of the user equipment devices may be associated with different users in a crowd of users. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance application data may be provided to the user equipment devices using any suitable approach. Media guidance application data may identify portions of the media content the user is accessing that the user may find objectionable. In some embodiments, this identification may be performed based on information stored in the user's profile information set on user equipment device 300. Media guidance application data may include data and/or other interactive features related to obscuring portions of currently accessed media content. More specifically, media guidance application data could include information identifying different portions of the content being displayed with different parental control ratings. This may enable control circuitry 304 to determine whether control circuitry 304 should modify a portion of the media content being accessed by a user to prevent the user from hearing or seeing content the user may find objectionable (e.g., whether control circuitry 304 should prevent exposure to a portion of the content that violates a user's parental control restrictions). In some embodiments, the guidance application may be a stand-alone interactive television program guide that receives program guide data via a data feed (e.g., a continuous feed or trickle feed).

The term obscure may refer to any suitable degree of content concealment or censorship and/or method of obscuring media content. The term obscure may refer to modifying visual content to obscure a portion and the entirety of the original visual content. For example, obscuring visual content may involve blurring the original visual content, completely blocking the original visual content, and/or replacing the original visual content with different visual content. The term obscure may also refer to modifying audio content to obscure a portion or the entirety of the original audio content. For example, obscuring audio content may involve scrambling the original audio content, silencing the original audio content, and/or replacing the original audio content with different audio content. For example, the term obscure may refer to replacing a word in the audio content or subtitles that violates parental control restrictions with one that satisfies the parental control restrictions.

Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of remote server 415. When executed by control circuitry of remote server 415 (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. YouTube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, access to messages posted by users in a crowd, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

In some embodiments, different parental control restrictions may be set up for different users. For example, a first user (e.g., a parent) may be associated with parental control restrictions that enable access to all content with no limits. A second user (e.g., a teenage child) may be associated with parental control restrictions that enable access to only content that is below a first authorization level (e.g., content below an R rating). A third user (e.g., a young child) may be associated with parental control restrictions that enable access to only content that is below a second authorization level (e.g., content below a G rating) that is lower than the first authorization level. Enabling access to content as referred to herein means that the content to which access is prevented is obscured. Obscured content may be revealed when a predefined access code (or some other authentication, such as a fingerprint or biometric information) is entered by the user.

As referred to herein, the phrase "authorization level" means a measure of content classification identifying the type and strength of mature content. Higher authorization levels allow access to content having more mature content than lower authorization levels. Namely, a lower authorization level restricts access to content having less mature content than a higher authorization level. Higher authorization level may allow access to a greater selection of content than a lower authorization level. Specifically, an authorization level of R may allow access to R rated content and PG-13 and below while an authorization level of PG-13 may allow access to PG-13 content and below but not R rated content because an R rating may be associated with a higher level than PG-13. In some implementations, the authorization level may correspond to the television rating system (e.g., 'A' for adult themes and/or dangerous stunts—USED IN: PG, M, MA, AV/MAV, R and X. Strengths Are: "Adult Themes" (PG) & "Strong Adult Themes" (M, MA, AV, R & X.); 'V' for violence—USED IN: PG, M, MA, AV/MAV, and R. Strengths Are: "Mild Violence" (PG), "Some Violence" (PG, M, MA), "Frequent Violence" (M, AV), "Strong Violence" (M, AV) & "Frequent Strong Violence" (AV.); 'L' for coarse language—USED IN: PG, M, MA, AV/MAV, R and X. Strengths Are: "Mild Coarse Language" (PG), "Some Coarse Language" (PG, M, MA, AV, R & X), "Frequent Coarse Language" (M, MA, AV, R & X), "Very Coarse Language" (M, MA, AV, R & X) & "Frequent Very Coarse Language" (MA, AV, R & X.); 'S' for sexual references and/or sex scenes—USED IN: PG, M, MA, AV/MAV R and X. Strengths Are: "Sexual References" (PG, M, MA, AV, R & X), "Strong Sexual References" (M, MA, AV, R & X), "A Sex Scene" (M, MA, AV, R & X), "Sex Scenes" (M, MA, AV, R & X), "A Strong Sex Scene" (M, MA, AV, R & X) & "Strong Sex Scenes" (M, MA, AV, R & X.); 'H' for horror or supernatural themes—USED IN: M, MA, AV/MAV and R. Strengths Are: "Horror" (M, MA, AV & R), "Supernatural Themes" (PG, M, MA, AV & R), "Strong Horror" (M, MA, AV & R) & "Strong Supernatural Themes" (M, MA, AV & R.); and 'D' for drug references and/or drug use—USED IN: PG, M, MA, AV/MAV, R and X. Strengths Are: "Drug References" (PG, M, MA, AV, R & X), "Drug Use" (M, MA, AV, R & X), "Strong Drug References" (M, MA, AV, R & X) & "Strong Drug Use" (M, MA, AV, R & X.). In some implementations, the authorization level may correspond to the movie content rating system (G, PG, R, PG-13, X, NC-17).

In some implementations, content to which access is prevented for a given parental control restrictions may include blocking a channel, program, or content source completely from being accessed. In some implementations, content to which access is prevented for a given parental control restrictions may include obscuring only the portion that violates the given parental control restrictions (e.g., by masking the obscene or offensive material or replacing the material with content that does not violate the parental control restrictions). It should be understood that content that does not violate a given parental control restrictions is referred to as content that satisfies the given parental control restrictions.

In some embodiments, control circuitry 304 may utilize a user recognition engine to identify users within a perceivable range of user equipment device 300. For example, control circuitry 304 may utilize a user recognition engine to identify users within a shared screen display (a display viewable simultaneously by the identified users). In response to identifying the users, control circuitry 304 may retrieve parental control settings associated with the identified users. Control circuitry 304 may process the retrieved parental control settings to identify the maximum allowable authorization level among the parental control settings. For example, a first user may be associated with a parental control setting that enables access to PG rated content and below and a second user may be associated with a parental control setting that enables access to R rated content and below (or no limit at all). In response, control circuitry 304 may identify PG rated content as being the maximum allowable authorization level for the first and second users to access content on user equipment device 300 together. In some implementations, to identify the maximum allowable authorization level, control circuitry 304 may compute a maximum authorization level of each retrieved parental control setting. Control circuitry 304 may then identify as the maximum allowable authorization level, the minimum value among the computed maximum authorization levels.

Control circuitry 304 may receive a request to access content on user equipment device 300 (e.g., the shared display). In response, control circuitry 304 may determine whether the content selected satisfies the maximum allowable authorization level. When the selected content satisfies the maximum allowable authorization level, control circuitry 304 may generate a display of the selected content on the shared display of user equipment device 300. When the selected content does not satisfy the maximum allowable authorization level, control circuitry 304 may request an authentication to be input (e.g., an access PIN), to allow access to the content that violates the parental control settings of one of the users. Alternatively, control circuitry 304 may determine whether another version of the selected content (e.g., a version in which the offensive material or the material that violates the parental control restrictions is censured or obscured) is available that satisfies the maximum allowable authorization level. In response to determining that another version is available, control circuitry 304 may automatically select the alternate version that satisfies the maximum allowable authorization level for display on the shared display of user equipment device 300.

In some embodiments, control circuitry 304 may determine whether the originally selected content (e.g., the content that is not censured or obscured) satisfies the parental control restrictions associated with a second one of the users even though it violates the parental control restrictions of a first one of the users. In response to determining that the originally selected content satisfies the parental control restrictions of a second user but violates the parental control restrictions of the first user, control circuitry 304 may identify a conflict among the parental control settings. In some implementations, to resolve the conflict, control circuitry 304 may generate for display on the shared display the alternate version of the content (e.g., the version having the material that violates the parental control settings of one user censured) in a first form. While the censured version is being presented in a first form, control circuitry 304 may cause the originally selected content (e.g., the non-censured version) and/or supplemental content associated with the originally selected content to be displayed in a second form.

As referred to herein the term "form" should be understood to mean a way content is presented to a user. A first form may include video while the second form may include only textual information. A first form may include video and/or audio while the second form may include only audio. A first form may include a first display format (e.g., one a shared screen of a television) having one aspect ratio while the second form may include a second display format (e.g., an individual screen of a portable device) having a different aspect ratio. A first form may include video and audio in one language while the second form may audio and/or textual information in a different language. A first form may include 2D video while the second form may include 3D video. A first form may include video perceivable without an optical device while the second form may include video perceivable only using an optical device. These forms are only exemplary and should not be understood to limit the term. Any other type of form for presenting content one way to first and second users and a different way to the first and second users may be used.

In some embodiments, the supplemental content associated with the originally selected content may include closed-caption information, subtitles, images, websites, video or any other information that violates the parental control settings of the first user but satisfies the parental control settings of the second user. In some embodiments, the first form may be a video of the alternate version of the content and the second form may include the display of only the subtitles of the originally selected content. The subtitles may be displayed overlaid on the alternate version of the content and/or the subtitles may be displayed only on a second screen device associated with the second user (e.g., the user associated with the parental control settings that are not violated by the originally requested content).

FIG. 5 shows an illustrative display screen 500 of setting up parental control restrictions in accordance with an embodiment of the invention. Screen 500 includes a parental control settings region 510 and a parental control conflict resolution region 520. Parental control settings region 510 includes options for defining parental control settings for different users. As referred to herein the phrase "parental control settings" is used interchangeably with the phrase "parental control restrictions".

Control circuitry 304 may include in parental control settings region 510 an identification of each user and the parental control settings associated with the respective user. The identification of each user may include a name of the user, a unique identifier of the user, an image or picture of the user, a video of the user, or the like. For example, a first user may be the master of user equipment device 300 and accordingly may be authorized to access all content without restrictions. The first user may be associated with a parental control setting that enables access to content with the highest authorization level. Control circuitry 304 may retrieve from storage 308 the parental control settings associated with the first user and display an indication of the authorization level associated with the retrieved settings next to the identifier of the first user. In particular, control circuitry 304 may determine that the first user has unlimited authorization level and accordingly display an indication that the first user has no limits.

In response to receiving a user selection of modify option 512, control circuitry 304 may allow the user to modify the parental control settings associated with the first user. In some implementations, in response to receiving the user selection of modify option 512, control circuitry 304 may display a prompt requesting authentication (e.g., a PIN code) before allowing any modifications to the parental control settings. In response to verifying the authenticity of the user making the change, control circuitry 304 may display options (similar to options 530, 532, and 534 discussed below) allowing the user to add/remove parental control restrictions that increase or decrease the authorization level associated with the first user. For example, control circuitry 304 may receive input that restricts access to content above an "R" rating to the first user.

Modify option 512 may be provided for each user displayed in region 510 and may require separate authentication to modify each user's parental control settings. After receiving a modification to the parental control settings for a given user, control circuitry 304 may store or update the parental control settings associated with the given user that are stored in storage 308.

In some embodiments, a second user may be a user having a middle range authorization level. For example, the second user may be a teenage child. Control circuitry 304 may retrieve from storage 308 the parental control settings associated with the second user and display an indication of the authorization level associated with the retrieved settings next to the identifier of the second user. In particular, control circuitry 304 may determine that the second user has a limited authorization level corresponding to content rating, channel numbers or groups, and content categories and accordingly control circuitry 304 may display an indication of these for the second user.

Rating limit 530 may indicate what ratings of content the given user is allowed to access. Specifically, any content rating greater than the content rating specified by rating limit 530 may violate the parental control restriction. In response to receiving a user selection of rating limit 530, control circuitry 304 may allow the user to modify the rating limit associated with the parental control settings of the second user. In some implementations, in response to receiving the user selection of rating limit 530, control circuitry 304 may display a prompt requesting authentication (e.g., a PIN code) before allowing any modifications to the parental control settings. In response to verifying the authenticity of the user making the change, control circuitry 304 may receive input that adds/removes ratings the second user is allowed/prevented from accessing and/or increases or decreases the rating authorization level associated with the second user.

Channel restriction 532 may indicate what channels or groups of content sources the given user is allowed to access. Specifically, accessing any channel or group of channels specified by channel restriction 532 may violate the parental control restriction. In response to receiving a user selection of channel restriction 532, control circuitry 304 may allow the user to modify the channel restriction associated with the parental control settings of the second user. In some implementations, in response to receiving the user selection of channel restriction 532, control circuitry 304 may display a prompt requesting authentication (e.g., a PIN code) before allowing any modifications to the parental control settings. In response to verifying the authenticity of the user making the change, control circuitry 304 may receive input that adds/removes channels the second user is prevented from accessing and/or increases or decreases the channel authorization level associated with the second user.

Category limit restriction 534 may indicate what categories of content sources the given user is allowed to access. Specifically, accessing any content source specified by category limit restriction 534 may violate the parental control restriction. In response to receiving a user selection of category limit restriction 534, control circuitry 304 may allow the user to modify the content restriction associated with the parental control settings of the second user. In some implementations, in response to receiving the user selection of category limit restriction 534, control circuitry 304 may display a prompt requesting authentication (e.g., a PIN code) before allowing any modifications to the parental control settings. In response to verifying the authenticity of the user making the change, control circuitry 304 may receive input that adds/removes categories of content sources the second user is prevented from accessing and/or increases or decreases the channel authorization level associated with the second user.

In response to receiving a user selection of add user option 514, control circuitry 304 may allow the user to add another user (e.g., user 4) and to specify parental control restrictions for the added user. Parental control restrictions for the added user may be modified in a similar manner as discussed above in connection with the modify option 512.

Although only three different types of content parental control restrictions are shown and described (e.g., rating limits, channel restrictions, and category limits) any other types or number of content restrictions may be defined for the same or different users.32498143_1

Parental control conflict resolution region 520 may allow a user to specify how control circuitry 304 should handle presenting content when parental control restrictions differ between two or more users within a perceivable range of user equipment device 300. For example, control circuitry 304 may determine the existence of a parental control conflict needing resolution when a first user and a second user are within a perceivable range of user equipment device 300 and request access to content associated with an 'R' content rating. Specifically, control circuitry 304 may determine based on parental control settings of the first user, that the first user has no restrictions and so may freely access the content associated with the 'R' rating. However, control circuitry 304 may determine based on parental control settings of the second user, that the second user has a rating limit 530 disallowing access to content having a rating greater than PG-13 and so may not be allowed to access the content associated with the 'R' rating. In such a circumstance, control circuitry 304 may retrieve a parental control conflict resolution specified in region 520.

In response to receiving a user selection of option 522, control circuitry 304 may cause the selected media asset to be presented in a version that does not violate restrictions of any user within a perceivable range of user equipment device 300. An illustrative display associated with selection of option 522 is provided in connection with FIG. 6. In some implementations, multiple versions of a given media asset may be stored and available for access. Each version may be suitable for different parental control restrictions. Specifically, a first version may be an edited version that excludes content that exceeds a rating restriction for content having a rating greater than PG. A second version may be an edited version that excludes content that exceeds a rating restriction for content having a rating greater than PG-13. A third version may be an un-edited version that does not exclude any content based on a rating restriction. Control circuitry 304 may select the version of the media asset that matches a greatest allowable parental control level amongst the parental control settings of all the users within the perceivable range of user equipment device 300. For example, when the first user has no limits and the second user has a rating restriction for content exceeding an 'R' rating, control circuitry 304 may select the second version of the content instead of the third version. This selection may occur since the second version still satisfies the parental control restrictions of the second user but is not the third version of the content that is suitable for a lower content rating level than the second version.

In some implementations, one version of a given media asset may be stored and available for access. In such a circumstance, control circuitry 304 may present the one version of the given media asset on user equipment device 300 but may edit, remove or replace content that exceeds a parental control restriction of any user within a perceivable range of user equipment device 300 while the media asset is being displayed. For example, control circuitry 304 may replace unsuitable language being spoken in the media asset for one or more of the users, with language that satisfies the parental control restrictions of those users.

In response to receiving a user selection of option 524, control circuitry 304 may block or prevent the media asset from being presented on user equipment device 300 when control circuitry 304 determines that the media asset includes content that violates a parental control restriction for any user within the perceivable range of user equipment device 300. In such circumstances, in response to receiving an instruction to display the media asset on user equipment device 300, control circuitry 304 may present a prompt indicating that the media asset violates the parental control restrictions of at least one user within the perceivable range of user equipment device 300. Control circuitry 304 may indicate which user's parental control settings are being violated and may allow a user to provide an authentication (e.g., a PIN or password) to authorize control circuitry 304 to access the selected content despite the violation.

In response to receiving a user selection of option 526, control circuitry 304 may present the version of the media asset that violates the parental control settings of a first user on a second screen device associated with a second user whose parental control restrictions are not violated by the version. An illustrative display associated with selection of option 526 is provided in connection with FIG. 7. In some implementations, multiple edited versions of the selected media asset may be stored and available for access to control circuitry 304. As discussed in connection with option 522, control circuitry 304 may select one of the versions that satisfies the parental control restrictions of all users within the perceivable range of user equipment device 300 on a display associated with user equipment device 300. Control circuitry 304 may select another version (e.g., a first version) that is associated with a content authorization level that is higher than the content authorization level of the version being presented on a display associated with user equipment device 300 and that satisfies the parental control restrictions of the first user. Control circuitry 304 may present that selected first version with the higher content authorization level for presentation of a second screen device associated with the second user simultaneously while the second version is being displayed on a display associated with user equipment device 300.

In some implementations, one version of a given media asset may be stored and available for access. In such a circumstance, control circuitry 304 may present the one version of the given media asset on user equipment device 300 but may edit, remove or replace content that exceeds a parental control restriction of any user within a perceivable range of user equipment device 300 while the media asset is being displayed. For example, control circuitry 304 may replace unsuitable language being spoken in the media asset for one or more of the users, with language that satisfies the parental control restrictions of those users. Control circuitry 304 may present the same version on a second screen device associated with the user whose parental control restrictions are not violated without editing the content. In some implementations, control circuitry 304 may present an edited version of the media asset on user equipment device 300 having content that exceeds a parental control restriction of any user within a perceivable range of user equipment device 300 edited, removed or replaced with first content that satisfies the parental control restrictions of all users within a perceivable range of user equipment device 300. At the same or substantially the same time, control circuitry 304 may present an edited version of the media asset a second screen device associated with a second user having content that exceeds a parental control restriction of a first user within a perceivable range of user equipment device 300 edited, removed or replaced with second content that satisfies the parental control restrictions of the second user. At the same or substantially the same time, control circuitry 304 may present an edited version of the media asset a second screen device associated with a third user having content that exceeds a parental control restriction of a first user within a perceivable range of user equipment device 300 edited, removed or replaced with third content that satisfies the parental control restrictions of the third user. The first, second and third content may be the same or different. For example, the second content may correspond to a first subset of language suitable for the second user but not the first user. The third content may correspond to a second subset of language suitable for the third user but not the first user or the second user.

In response to receiving a user selection of option 528, control circuitry 304 may present supplemental content associated, with the selected media asset, that violates the parental control settings of a first user but does not violate the parental control settings of a second user in a different form on a display associated with user equipment device 300. An illustrative display associated with selection of option 526 is provided in connection with FIG. 7. In some implementations, a media asset may be stored and available for access to control circuitry 304 with multiple forms of supplemental content. Supplemental content may include subtitles, clips, videos, websites, text, blogs or any other content related to the media asset. As discussed in connection with option 522, control circuitry 304 may select a version of the media asset that satisfies the parental control restrictions of all users within the perceivable range of user equipment device 300 on a display associated with user equipment device 300. Control circuitry 304 may select supplemental content associated with the selected media asset that is associated with a content authorization level that is higher than the content authorization level of the media asset version being presented on a display associated with user equipment device 300 and that satisfies the parental control restrictions of the first user but not a second user. Control circuitry 304 may present the supplemental content with the higher content authorization level on the display associated with the user equipment device 300 in a first form simultaneously while the media asset on the display associated with user equipment device 300 is being displayed in a second form.

In some implementations, control circuitry 304 may present a selected media asset on user equipment device 300 in a second form in which content that exceeds a parental control restriction of any user within a perceivable range of user equipment device 300 is edited, removed or replaced with content that satisfies the parental control restrictions of all users within the perceivable range of user equipment device 300. For example, control circuitry 304 may replace unsuitable language being spoken in the media asset for one or more of the users, with language that satisfies the parental control restrictions of those users. Control circuitry 304 may present supplemental content (e.g., subtitles) associated with the media asset in a first form for the user whose parental control restrictions are not violated on the same display as the media asset. Alternatively or in addition, control circuitry 304 may present supplemental content (e.g., different language) associated with the media asset in a first form for the user whose parental control restrictions are not violated on a different device (e.g., headphones). In some implementations, control circuitry 304 may mute or suppress the volume of the audio which violates the parental control restrictions of a second user and replace the audio with audio in a different language that only a first user understands whose parental control restrictions are not violated by the suppressed content.

Figure 6:
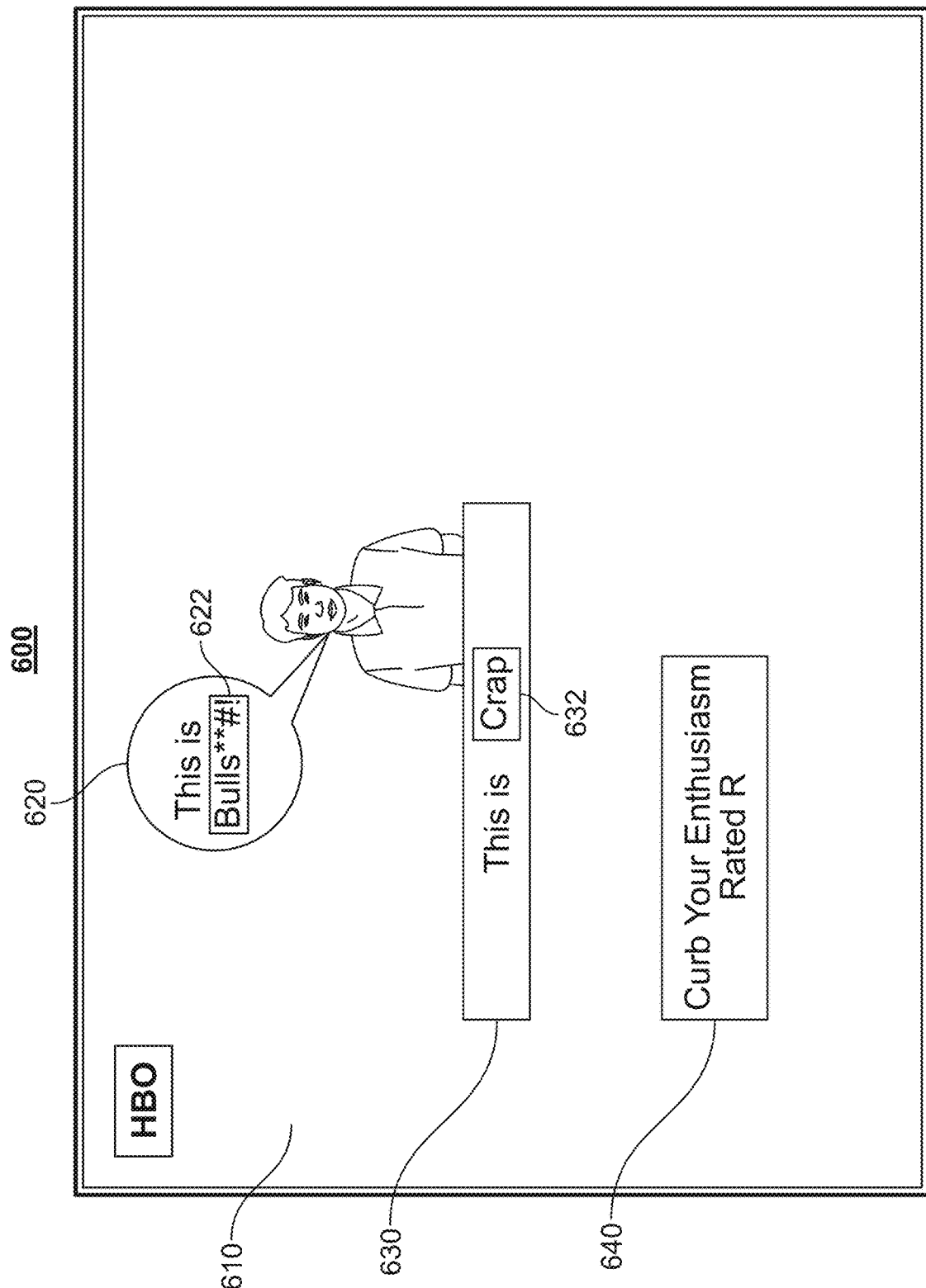
FIG. 6 shows an illustrative display screen of presenting content in different forms based on different parental control restrictions using one device in accordance with an embodiment of the invention.

FIG. 6 shows an illustrative display screen 600 of presenting content in different forms based on different parental control restrictions using one device in accordance with an embodiment of the invention. Display 600 includes a media asset 610 being presented in a first form, detailed information 640, and supplemental content 630 associated with the media asset being presented in a second form.

For example, a first user associated with a first parental control restriction having a first authorization level may be within a perceivable range of display 600 (e.g., user equipment device 300) along with a second user associated with a second parental control restriction having a second authorization level that is lower than the first level. Media asset 610 may be presented on shared display 600 of user equipment device 300 to the first and second users in a first form. Specifically, media asset 610 may include first content 620 (e.g., spoken language) that violates the second user's parental control restrictions but not the first user's parental control restrictions. Specifically, at some point during playback or display of the media asset the words 622 having inappropriate language (e.g., language having an 'R' rating) may be detected and prevented from being presented to the first and second users (e.g., by suppressing the audio portion or replacing the words with different words). In such circumstances, the first form may be an edited version of the media asset.

While the media asset is being presented in the first form, control circuitry 304 may present supplemental content associated with the media asset in a second form (e.g., a textual form that includes subtitles). The supplemental content being presented in the second form may violate the parental control restrictions of the second user but may satisfy the parental control restrictions of the first user. The second form being displayed may include a representation 632 (visual, audible, and/or textual) of the first content that was suppressed or replaced in the first form being displayed. For example, when the first form was unsuitable language being spoken the second form may provide the text of the unsuitable language. In such circumstances, the second user may be young child that does not know how to read and thereby will not be exposed to the unsuitable content even though it is being presented on the shared screen of user equipment device 300.

Figure 7:
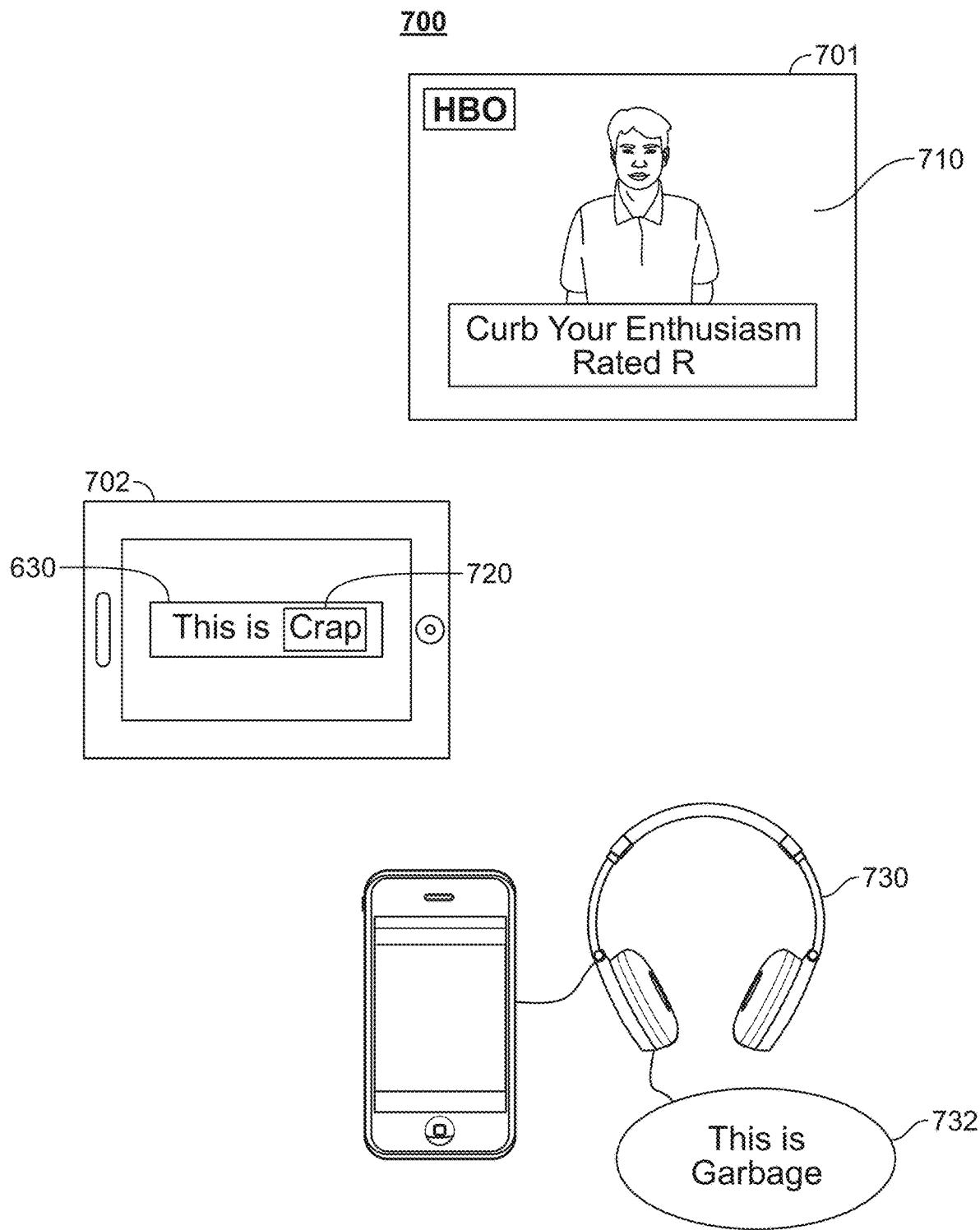
FIG. 7 shows an illustrative display system of presenting content in different forms based on different parental control restrictions using multiple devices in accordance with an embodiment of the invention.

FIG. 7 shows an illustrative display system 700 of presenting content in different forms based on different parental control restrictions using multiple devices in accordance with an embodiment of the invention. System 700 includes a shared screen 701, a personal second screen device 702 (e.g., a tablet), and a personal audio device 730 (e.g., headphones). In some embodiments, shared screen 701 is within a perceivable range of first, second and third users. The second user may be associated with second screen device 702 and the third user may be associated with personal audio device 730. Second screen device 702 may output video and/or audio such that only the user associated with second screen device 702 (e.g., the second user) is able to perceive the video and/or audio being output by second screen device 702. Personal audio device 730 may output only audio such that only the user associated with personal audio device 730 (e.g., the third user) is able to perceive the audio being output by personal audio device 730. Any number of additional personal or shared screen devices may be included in system 700 without departing from the scope of this disclosure.

In some embodiments, shared screen 701 may include a media asset 710 being presented in a first form. Second screen device 702 may present supplemental content 630 associated with media asset 710 in a second form. Personal audio device 730 may present supplemental content 732 associated with media asset 710 in a third form. The supplemental content presented by second screen device 702 may include content that violates the parental control restrictions of the first user and the third user but satisfies the parental control restrictions of the second user. The supplemental content presented by personal audio device 730 may include content that violates the parental control restrictions of the first user but satisfies the parental control restrictions of the second user and the third user. Specifically, the supplemental content presented by personal audio device 730 may be associated with a content authorization level that is between the content authorization level associated with the content presented on shared screen 701 and the content authorization level associated with the supplemental content presented on second screen device 702. The supplemental content presented by second screen device 702 may be associated with a content authorization level that exceeds or is greater than the content authorization level associated with the content presented on shared screen 701 and the content authorization level associated with the supplemental content presented by personal audio device 730.

For example, a first user associated with a first parental control restriction having a first content authorization level may be within a perceivable range of shared screen 701 (e.g., user equipment device 300) along with a second user associated with a second parental control restriction having a second content authorization level that is higher than the first level and a third user associated with a third parental control restriction having a third content authorization level that is between the first content authorization level and the second content authorization level. Media asset 710 may be presented on shared display 600 of user equipment device 300 to the first, second and third users in a first form. Media asset 710 may be the same or similar as media asset 610. Specifically, media asset 710 may include first content 620 (e.g., spoken language) that violates the second and third users' parental control restrictions but not the first user's parental control restrictions. Specifically, at some point during playback or display of the media asset words 622 having inappropriate language (e.g., language having an 'R' rating) may be detected and prevented from being presented to the first, second and third users (e.g., by suppressing the audio portion or replacing the words with different words) using shared screen 701. In such circumstances, the first form may be an edited version of the media asset. The prevention of the inappropriate language from being presented using shared screen 701 may be performed in any manner discussed above in connection with obscuring content (e.g., by retrieving from storage a given version of the media asset from multiple versions and/or editing the content being presented in real-time).

While the media asset is being presented in the first form on shared screen 701, second screen device 702 may present supplemental content associated with the media asset in a second form (e.g., a textual form that includes subtitles). The supplemental content being presented in the second form may violate the parental control restrictions of the first user but may satisfy the parental control restrictions of the second user. The second form being displayed may include a representation 720 (visual, audible, and/or textual) of the first content that was obscured in the first form from being displayed. For example, when the first form was unsuitable language being spoken the second form may provide the text of the unsuitable language. In such circumstances, the first user and the third user may not be exposed to the unsuitable content and the second user may enjoy being exposed to the unsuitable content in another form.

Second screen device 702 may include a database that matches a given unsuitable word with a list of alternate versions of the word each word in the list satisfying a different content authorization level. Second screen device 702 may receive the unsuitable word being spoken on shared screen 701 and transmit a query to the database that includes the content authorization level of the second user. The database may receive the query and return one of the words in the database that matches the unsuitable word and the content authorization level of the second user. Second screen device 702 may then play back the supplemental content with the retrieved word in place of the unsuitable word when the media asset is being presented to the first, second and third users.

Similarly, while the media asset is being presented in the first form on shared screen 701 and supplemental content is being presented on second screen device 702, personal audio device 730 may present the supplemental content associated with the media asset in a third form (e.g., audio only). The supplemental content being presented in the third form may violate the parental control restrictions of the first user but may satisfy the parental control restrictions of the third user. The third form being presented may include a representation 732 (audible) of the first content that was obscured in the first form from being displayed. For example, when the first form was unsuitable language being spoken, the third form may provide the audio of the unsuitable language that was obscured. Alternatively, when the first form was unsuitable language being spoken, the third form may provide an edited version of the audio of the unsuitable language that was obscured. For example, the edited version being presented in the third form may replace the unsuitable words being spoken in the first form with suitable words that satisfy the parental control restrictions of the third user.

Personal audio device 730 may include a database that matches a given unsuitable word with a list of alternate versions of the word each word in the list satisfying a different content authorization level. Personal audio device 730 may receive the unsuitable word being spoken on shared screen 701 and transmit a query to the database that includes the content authorization level of the third user. The database may receive the query and return one of the words in the database that match the unsuitable word and the content authorization level of the third user. Personal audio device 730 may then play back audibly the retrieved word in place of the unsuitable word when the media asset is being presented to the first, second and third users.

Figure 8:
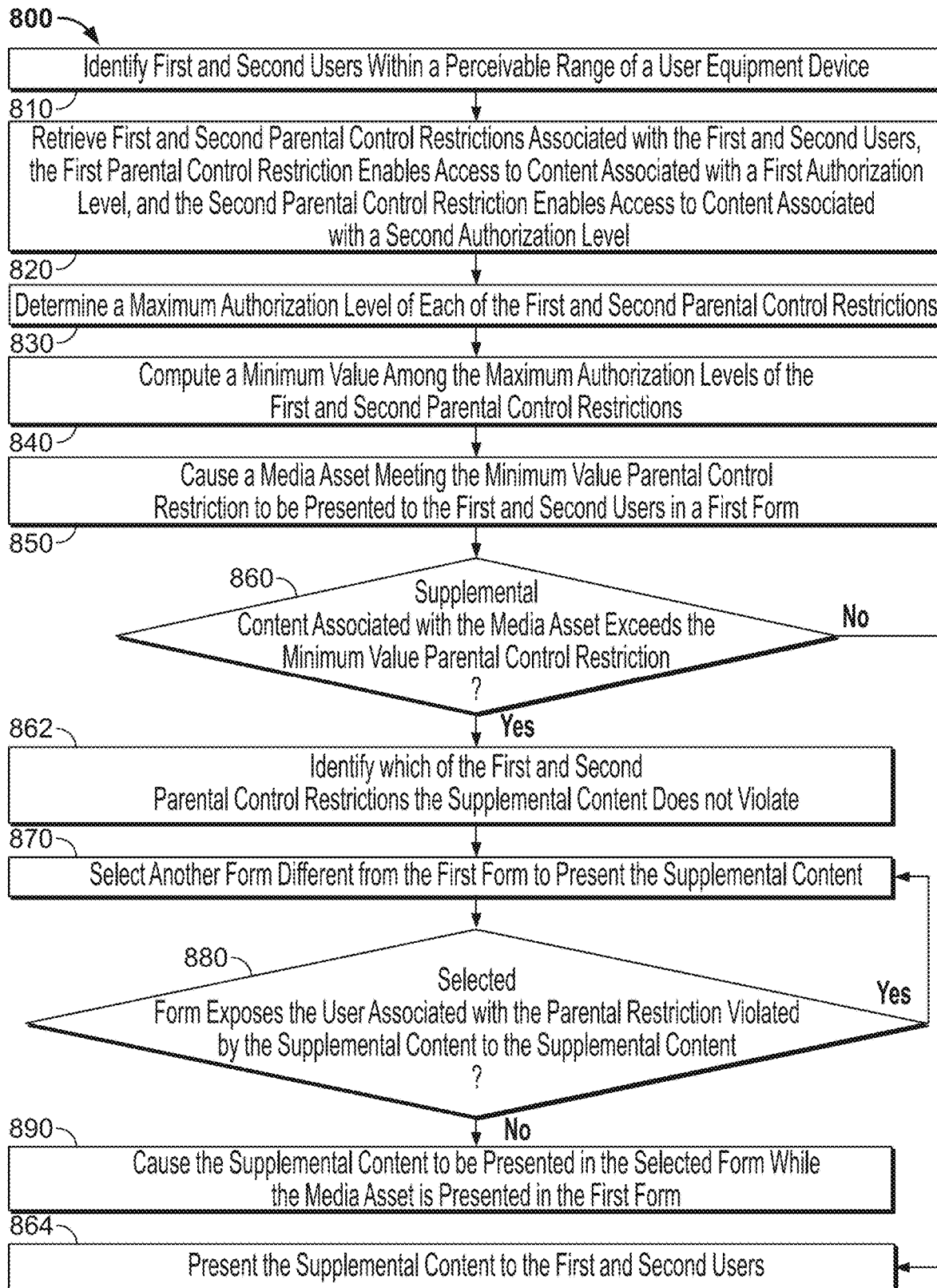
FIG. 8 is a diagram of a process for presenting content in different forms based on different parental control restrictions in accordance with embodiments of the invention.

FIG. 8 is a diagram of a process 800 for presenting content in different forms based on different parental control restrictions in accordance with embodiments of the invention. At step 810, first and second users are identified to be within a perceivable range of a user equipment device. For example, control circuitry 304 may utilize a user recognition engine to identify which users are within a perceivable range (e.g., a predetermined distance) from a shared screen (FIG. 3). The user recognition engine may retrieve a user profile associated with each identified user.

At step 820, first and second parental control restrictions associated with the first and second users respectively are retrieved. The first parental control restriction enables access to content associated with a first authorization level and the second parental control restriction enables access to content associated with a second authorization level. For example, control circuitry 304 may retrieve a rating limit 530 specified for a second user and channel restriction 532 specified for a third user (FIG. 5).

At step 830, a maximum authorization level of each of the first and second parental control restrictions is determined. For example, control circuitry 304 may select a first type of content restriction (e.g., a rating limit) and identify a maximum rating a first user is authorized to access (e.g., content rated PG-13 and below) and a second user is authorized to access (e.g., content rated G and below). In such circumstances, the maximum rating the first user is authorized to access is PG-13 and the maximum rating the second user is authorized to access is G.

At step 840, a minimum value among the maximum authorization levels of the first and second parental control restrictions is computed. For example, control circuitry 304 may determine that the maximum content rating of the second user (e.g., G) is lower than the maximum content rating of the first user (e.g., PG-13). Accordingly, control circuitry 304 may compute the minimum value to be G rated content.

At step 850, a media asset meeting the minimum value parental control restriction is caused to be presented to the first and second users in a first form. For example, control circuitry 304 may select a version of a media asset that does not violate the parental control restriction of the second user (e.g., a media asset version that is rated G or lower). Alternatively, control circuitry 304 may present any media asset to the first and second users and edit the media asset in real-time to obscure any content that exceeds a G rating from being presented to the first and second users. The first form may be video and audio that the first and second users can both see and hear. For example, control circuitry 304 may present media asset 610 on display 600 or media asset 710 on shared screen 701 (FIGS. 6 and 7).

At step 860, a determination is made as to whether supplemental content associated with the media asset exceeds the minimum value parental control restriction. In response to determining that the supplemental content exceeds the minimum value parental control restriction, the process proceeds to step 862, otherwise the process proceeds to step 864. For example, control circuitry 304 may determine whether spoken audio 620, text, and/or video associated with the media asset being presented violates the minimum value parental control restriction (e.g., a rating of G) (FIG. 6).

At step 862, an identification of which of the first and second parental control restrictions the supplemental content does not violate is made. For example, control circuitry 304 may determine whether the supplemental content satisfies the first user or second user parental control settings. In particular, if the supplemental content is associated with a PG rating, control circuitry 304 may determine that the supplemental content violates the second user's parental control restriction of only allowing G rated content and below but satisfies the first user's parental control restriction.

At step 870, another form different from the first form is selected to present the supplemental content. For example, control circuitry 304 may select a textual representation of the supplemental content instead of the audible spoken language. Alternatively, control circuitry 304 may determine whether a second screen device or other personal media device is associated with the first user and present the selected other form to be presented on a second screen device or personal media device associated with the first user.

At step 880, a determination is made as to whether the selected form exposes the user, associated with the parental control restrictions violated by the supplemental content, to the supplemental content. In response to determining that the selected form exposes the user to the supplemental content, the process proceeds to step 870, otherwise the process proceeds to step 890. For example, control circuitry 304 may determine that presenting the supplemental content in textual form instead of audible form will not expose the second user to the supplemental content even though it will still appear on the shared screen device because the second user may be illiterate or a child that cannot read (FIG. 6). Alternatively, control circuitry 304 may determine that presenting the supplemental content in another language instead of language the media asset is being presented will not expose the second user to the supplemental content even though it will still be heard by the second user because the second user may understand the other language (FIG. 6). Alternatively, control circuitry 304 may determine that presenting the supplemental content on a second screen device or personal media device associated with the first user instead of on the shared screen device will not expose the second user to the supplemental content (FIG. 7).

At step 890, the supplemental content is caused to be presented in the selected form while the media asset is presented to the first and second users in the first form.

At step 864, the supplemental content is presented to the first and second users.

It should be understood, that the above steps of the flow diagram of FIG. 8 may be executed or performed in any order or sequence not limited to the order and sequence shown and described in the figure. Also, some of the above steps of the flow diagram of FIG. 8 may be executed or performed substantially simultaneously where appropriate or in parallel to reduce latency and processing times.

The above-described embodiments of the present disclosure are presented for purposes of illustration and not of limitation, and the present disclosure is limited only by the claims which follow.

What is claimed is:

1. A method comprising:
   receiving a request to consume a media asset on a shared screen;
   determining that the media asset is to be consumed by a first user and a second user that are within a predefined range of the shared screen;
   determining that first user is restricted to consume the media asset in its original form which includes a portion of unsuitable visual content while the second user does not have such a restriction;
   in response to the determination that first user is restricted to consume the media asset in its original form which includes a portion of unsuitable visual content while the second user does not have such a restriction:
      obscuring the unsuitable visual content of the media asset; and
      simultaneously displaying the obscured unsuitable visual content on the shared screen and the media asset in its original form that contains unsuitable visual content on a second device associated with the second user.

2. The method of claim 1, wherein obscuring the unsuitable visual content of the media asset further comprises, blurring the portion of unsuitable visual content.

3. The method of claim 1, wherein obscuring the unsuitable visual content of the media asset further comprises, replacing the portion of unsuitable visual content with suitable content that is not restricted for the first user.

4. The method of claim 1, wherein obscuring the unsuitable visual content comprises either obscuring the portion of unsuitable visual content or obscuring the media asset in its entirety.

5. The method of claim 1, further comprising:
   determining that the unsuitable visual content includes unsuitable audio content; and
   in response determining that the unsuitable visual content includes unsuitable audio content:
      scrambling the unsuitable audio content; and
      playing the scrambled audio content on the shared screen.

6. The method of claim 1, further comprising:
   determining that the unsuitable visual content includes audio content with words that the first user is restricted to consume; and
   in response determining that the unsuitable visual content includes audio content with words that the first user is restricted to consume:
      replacing the words that the first user is restricted to consume with words that are no restricted for the first user; and
      playing the media asset with the replaced words on the shared screen.

7. The method of claim 1, wherein the first user's restrictions are determined by:
   retrieving a user profile associated with the first user;
   identifying parental control restrictions associated with the first user based on their user profile; and
   determining the first user's restriction based on the identified parental control restrictions from their user profile.

8. The method of claim 7, wherein the parental control restrictions in the user profile are automatically compiled based on user access history.

9. The method of claim 1, further comprising:
 determining that subtitles associated with a portion of the media asset includes unsuitable text that the first user is restricted to consume; and
 replacing the subtitles in response to the determination that the subtitles include unsuitable text that the first user is restricted to consume, wherein the replaced subtitles are within allowed restrictions for consumption by the first user.

10. The method of claim 1, wherein the determination that first user is restricted to consume the media asset is based on the media asset exceeding a content rating that is allowed for the first user.

11. A system comprising:
 one or more control circuitries configured to:
  receive a request to consume a media asset on a shared screen;
  determine that the media asset is to be consumed by a first user and a second user that are within a predefined range of the shared screen;
  determine that first user is restricted to consume the media asset in its original form which includes a portion of unsuitable visual content while the second user does not have such a restriction;
  in response determining that first user is restricted to consume the media asset in its original form which includes a portion of unsuitable visual content while the second user does not have such a restriction:
   obscure the unsuitable visual content of the media asset; and
   simultaneously display the obscured unsuitable visual content on the shared screen and the media asset in its original form that contains unsuitable visual content on a second device associated with the second user.

12. The system of claim 11, wherein obscuring the unsuitable visual content of the media asset further comprises, one or more control circuitries configured to blur the portion of unsuitable visual content.

13. The system of claim 11, wherein obscuring the unsuitable visual content of the media asset further comprises, one or more control circuitries configured to replace the portion of unsuitable visual content with suitable content that is not restricted for the first user.

14. The system of claim 11, wherein obscuring the unsuitable visual content comprises one or more control circuitries configured to either obscure the portion of unsuitable visual content or obscuring the media asset in its entirety.

15. The system of claim 11, further comprising, one or more control circuitries configured to:
 determine that the unsuitable visual content includes unsuitable audio content; and
 in response determining that the unsuitable visual content includes unsuitable audio content:
  scramble the unsuitable audio content; and
  play the scrambled audio content on the shared screen.

16. The system of claim 11, further comprising, one or more control circuitries configured to:
 determine that the unsuitable visual content includes audio content with words that the first user is restricted to consume; and
 in response determining that the unsuitable visual content includes audio content with words that the first user is restricted to consume:
  replace the words that the first user is restricted to consume with words that are no restricted for the first user; and
  play the media asset with the replaced words on the shared screen.

17. The system of claim 11, wherein the first user's restrictions are determined by, the one or more control circuitries configured to:
 retrieve a user profile associated with the first user;
 identify parental control restrictions associated with the first user based on their user profile; and
 determine the first user's restriction based on the identified parental control restrictions from their user profile.

18. The system of claim 17, wherein the parental control restrictions in the user profile are automatically compiled by the one or more control circuitries based on user access history.

19. The system of claim 11, further comprising the one or more control circuitries configured to:
 determine that subtitles associated with a portion of the media asset includes unsuitable text that the first user is restricted to consume; and
 replace the subtitles in response to the determination that the subtitles include unsuitable text that the first user is restricted to consume, wherein the replaced subtitles are within allowed restrictions for consumption by the first user.

20. The system of claim 11, wherein the determination that first user is restricted to consume the media asset is based on the media asset exceeding a content rating that is allowed for the first user.

* * * * *